Aug. 25, 1936.     G. H. CASSADY     2,052,130
AIRPLANE WHEEL
Filed June 24, 1933

INVENTOR.
GERALD H. CASSADY
BY
ATTORNEYS.

Patented Aug. 25, 1936

2,052,130

UNITED STATES PATENT OFFICE 2,052,130

AIRPLANE WHEEL

Gerald H. Cassady, Detroit, Mich., assignor, by mesne assignments, to United States Rubber Company, New York, N. Y., a corporation of New Jersey Application June 24, 1933, Serial No. 677,404

9 Claims. (Cl. 152—20)

My invention relates to airplane wheels, and in particular to a pneumatic tire of special construction in combination with a complementary hub.

My invention is particularly adaptable for airplane tail wheels, although it may be used with equal advantage for the smaller sized airplane landing wheels.

An object of my invention is to shape a tire and hub in such manner as to present a streamline effect by constructing them of such shapes that, when assembled, they have substantially an elliptical shape in cross section, thus forming an airplane wheel having reducing air resistance by the reduction of air eddies.

Another object is to provide a tubeless tire which is complete in itself, requiring no assembly of the tube in the mounting operation, and reducing the time in which a tire can be mounted or dismounted.

A further advantage is the use of a single inextensible bead annulus.

A still further advantage is the combination in an airplane tire of a carcass having a true circular cross section. This is of advantage because in all tires there is a tendency for the inflated tire to blow circular in cross section. With the present construction the elliptical outer sectional profile of the tire will be retained in use.

Attempts have been made to make airplane tires with two spaced beads of conventional construction and disposition, and to shape the tires in a somewhat triangular form in cross section so as to approach closely to an elliptical shape at the end portions of the major axis. Such a tire will retain its partially elliptical form for a short period, but after it is in use for a length of time the tire will continually tend to blow to a circular cross section, eventually destroying its original elliptical shape.

I also propose that the circular tire carcass be disposed substantially outside of the outer diameter of the hub. Such a provision permits flexing of the circular tire carcass without lateral interference from the rim.

These and other objects and advantages will be apparent from the following detailed description, when considered in connection with the accompanying drawing, in which.

Figure 1:
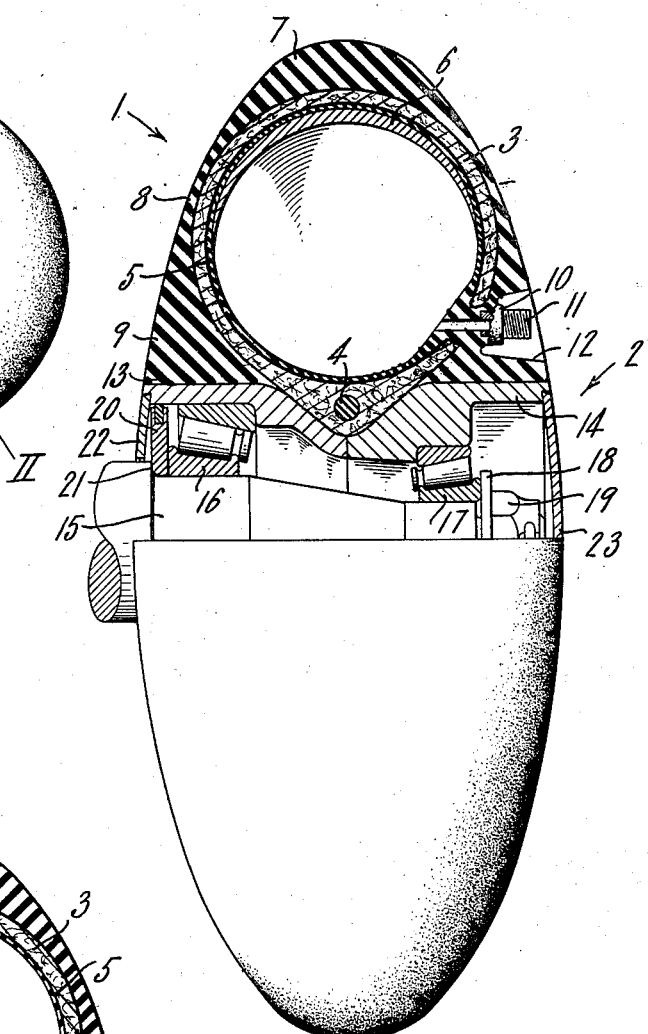
Fig. 1 is an edge elevational view, partly in section, of an assembled tire, hub and axle.

Referring to Fig. 1, I provide a separable tire 1 and a hub 2, which cooperate with each other so that the hub 2 operates to lock the tire securely in place. The tire and hub also cooperate with each other to form, in cross section, a substantially unbroken surface line in the shape of an ellipse.

The tire 1 comprises a carcass 3 of any suitable construction, such as laminated plies of rubberized fabric. The carcass 3 is provided at its inner periphery with an inextensible bead annulus 4. Preferably the bead 4 is embedded in the material of the carcass 3. The bead annulus 4 may be of any inextensible material such as a solid ring, or a plurality of wires as a cable. At the inner wall of the carcass, there is a ply or lining of rubber 5, for supplying the carcass material with an impervious coating in order to retain fluid pressure within the tire chamber. If desirable, a puncture sealing compound 6 may be applied to the inner wall of the ply 5, across the crown portion of the tire. The outer portions of the tire comprise a rubber tread 7, side walls 8 and ledge portions 9. The tread portion 7 has the double purpose of providing a thickened portion to increase wearing qualities, and at the same time to form the outer elliptical cross sectional profile of the tire while along its inner surface conforming to the circular cross section of the carcass.

In following out the general elliptical scheme of the tire, the rubber side walls 8 are made thin to cooperate with the circular carcass 3. The thickened rubber portions or ledges 9 have for their purpose to follow the general elliptical outline of the tire, and to form supports or rests against which the carcass 3 may be cushioned during side thrust movement.

As a port for introducing air into the tire chamber, I prefer to use a short, flexible valve stem 10, either composed of all rubber, or part fabric construction. A metallic threaded nipple 11 embedded in the rubber stem 10 is a conventional valve stem means for carrying the standard valve mechanism. In order that the valve stem will not break the uniform continuity of the tire outline, I provide a counterbore aperture 12 extending into the thickened ledge portion 9 and into which the valve stem extends from the carcass 3.

The hub 2 upon which the tire 1 is mounted comprises an inner hub member 13 and an outer hub member 14. The hub members 13 and 14 are cylindrical in form at their outer axial peripheries, while the central portions of the combined hub members decrease in thickness to form an annular indentation conforming to the inner peripheral shape of the tire 1.

The hub 2 is supported by an axle 15, and roller bearings 16 and 17. The latter are held in place by a washer 18 and a retaining nut 19. At the inner side of the hub 2 a grease retaining disc 20 interposes the bearing 16 and a shoulder 21 on the axle 15. A dust shield 22 and a disc cap 23 are attached to and close the ends of the hub members 13 and 14, respectively.

As a modification of the invention, the tire 1 may be vulcanized in adhesion with the inner and outer hub members 13 and 14, respectively. This method of union between the tire and hub insures proper support for the tire, and insures that the tire will not become loose from the hub by under-inflation of the tire or by other reasons.

Figure 2:
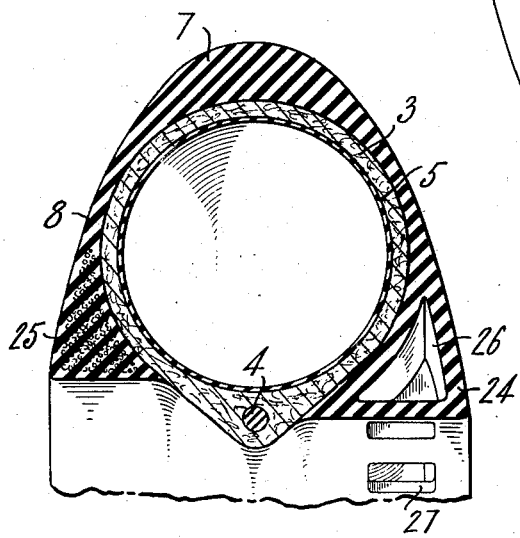
Fig. 2 is a cross sectional view of a portion of a modified form of tire, taken along lines II—II of Fig. 3.

The modified tire shown in Fig. 2 differs from that shown in Fig. 1 in that it is particularly designed to form a larger size wheel. The inner peripheral diameter of ledge 24 is smaller than the inner diameter of the ledge 25 to proportion the tire so that it will more closely compare with the differential diameters of the roller bearings or other hub and/or bearing constructions. The ledges 24 and 25 are made to form as great a part of the wheel as possible as it is much more economical to form that part of the wheel which follows the general elliptical cross sectional outline out of rubber than it is to form such part or parts of the wheel from the metal construction of the hub itself.

Figure 3:
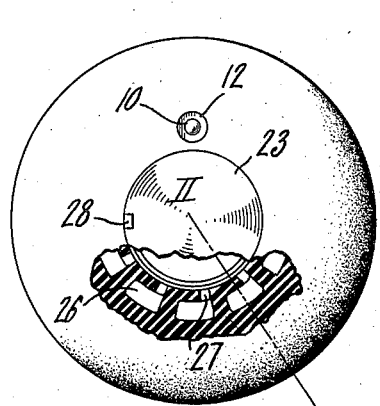
Fig. 3 is an end elevational view, partly in section, of a modified form of construction, shown in Fig. 2.

In the larger sized wheels or tires, where the ledge 24 becomes heavy by reason of its increased volume, it is desirable to incorporate cavities 26 into the body of the ledge 24. Such cavities may be formed during the manufacture of the tire by including segmental forms or cores which may later be withdrawn through apertures 27 joining the cavities 26 with the inner rim surface of the ledge 24. As shown in Fig. 3, a plurality of such cavities 26 may be equally spaced about the ledge 24.

As a further means of decreasing the weight of the ledges, the ledge 25 may be composed, in part, of sponge rubber dispersed about the ledge area as shown in Fig. 2. This latter method of decreasing the weight is of advantage in that it may be easily and quickly produced by merely incorporating a specially compounded rubber into this part of the tire during its construction, and allowing the minute air chambers of the sponge rubber to be formed during vulcanization.

The tire is easily and quickly mounted or dismounted from the axle 15, requiring only the removal of the disc cap 23 and the retaining nut 19. The hub members 13 and 14 may be withdrawn from the demounted tire by any suitable tool. The disc cap 23 is held in place by its own spring action, and a slot 28 at one edge of the disc enables the insertion of a tool for its removal.

While I have shown and described certain present preferred embodiments of the invention, it will be apparent to those skilled in the art that the invention is not so limited but that various modifications may be made therein without departing from the spirit of the invention or from the scope of the appended claims.

Having thus described my invention, what I claim and desire to protect by Letters Patent is:

1. A pneumatic tire comprising a carcass substantially circular in cross section, a tread portion and side walls progressively increasing in thickness towards the axis of the tire and uniting with said tread portion to give the outer surface of the tire, in cross section, an outline substantially conforming to that of a segment of an ellipse, said side walls terminating in rim engaging portions having cylindrical surfaces of material width axially of the tire.

2. A pneumatic tire comprising a carcass substantially circular in cross section, a tread portion, side walls progressively increasing in thickness towards the axis of the tire and uniting with said tread portion to give the outer surface of the tire, in cross section, an outline substantially conforming to that of a segment of an ellipse, said side walls terminating in rim engaging portions having cylindrical surfaces of material width axially of the tire, and a securing bead disposed below said carcass intermediate said cylindrical portions for securing the tire to a rim.

3. An airplane tire having thickened and lightened portions disposed inwardly of and laterally outside of a tire carcass for giving a stream-line external surface of the tire without excessive weight.

4. An airplane tire having hollow portions disposed inwardly of and laterally outside of a tire carcass for giving a stream-line external surface to the tire without excessive weight.

5. An airplane tire having portions containing sponge rubber disposed inwardly of and laterally outside of a tire carcass for giving a stream-line external surface of the tire without excessive weight.

6. A pneumatic tire comprising a carcass substantially circular in cross section, a tread portion, side walls and rim-engaging portions having an interior conforming to the cross sectional shape of said tire carcass, said tread portion and side walls progressively increasing in thickness towards the axis of the tire and uniting with said tread portion to give the outer surface of the tire, in cross section, an outline substantially conforming to that of a segment of an ellipse, and rim-engaging portions having cylindrical surfaces of material width axially of said tire.

7. A pneumatic tire comprising an inner member substantially circular in cross section, a tread portion, and side walls progressively increasing in thickness towards the axis of the tire and uniting with said tread portion to give the outer surface of the tire, in cross section, an outline substantially conforming to that of a segment of an ellipse, said side walls terminating in rim engaging portions having cylindrical surfaces of material width axially of the tire.

8. A pneumatic tire comprising an inner member substantially circular in cross section, a tread portion, side walls progressively increasing in thickness towards the axis of the tire and uniting with said tread portion to give the outer surface of the tire, in cross section, an outline substantially conforming to that of a segment of an ellipse, said side walls terminating in rim engaging portions having cylindrical surfaces of material width axially of the tire, and a securing bead disposed below said inner member intermediate said cylindrical portions for securing the tire to a rim.

9. A pneumatic tire comprising an inner member substantially circular in cross section, a tread portion, side walls and rim-engaging portions having an interior conforming to the cross sectional shape of said inner member, said tread portion and side walls progressively increasing in thickness towards the axis of the tire and uniting with said tread portion to give the outer surface of the tire, in cross section, an outline substantially conforming to that of a segment of an ellipse, and rim-engaging portions having cylindrical surfaces of material width axially of said tire.

GERALD H. CASSADY.